United States Patent [19]
Kay

[11] Patent Number: 5,564,878
[45] Date of Patent: Oct. 15, 1996

[54] APPARATUS AND METHOD FOR CONTINUOUS HANDLING OF BULK MATERIALS

[75] Inventor: Franklin J. Kay, Houston, Tex.

[73] Assignee: Texmarc Conveyor Company, Houston, Tex.

[21] Appl. No.: 334,672

[22] Filed: Nov. 4, 1994

[51] Int. Cl.⁶ ................................................. B65G 15/14
[52] U.S. Cl. ...................... 414/141.1; 198/703; 198/713; 414/142.5; 414/394
[58] Field of Search .......................... 414/142.1, 142.2, 414/142.5, 390, 391, 392, 393, 394, 133, 397, 345, 327, 133, 140.8, 140.9, 141.1, 141.2; 198/509, 519, 506, 701, 550.11, 703, 713, 711, 712

[56] References Cited

U.S. PATENT DOCUMENTS

| | | | |
|---|---|---|---|
| 2,788,118 | 4/1957 | Borrowdale | 198/713 X |
| 3,104,766 | 9/1963 | Sasadi | 414/141.1 X |
| 3,144,142 | 8/1964 | Wallace, Jr. | 414/142.5 |
| 3,881,590 | 5/1975 | Hartmann | 198/703 X |
| 4,585,384 | 4/1986 | Richard et al. | 414/141.1 |
| 4,681,503 | 7/1987 | Nolte | 414/142.5 |
| 4,988,250 | 1/1991 | Yamanaka | 414/142.5 X |

FOREIGN PATENT DOCUMENTS

| | | | |
|---|---|---|---|
| 467467 | 1/1975 | Australia | 414/141.1 |
| 1456277 | 10/1969 | Germany | 414/142.5 |
| 7630 | 1/1984 | Japan | 414/141.1 |
| 363645 | 12/1972 | U.S.S.R. | 414/141.1 |
| 755700 | 8/1980 | U.S.S.R. | 198/713 |

OTHER PUBLICATIONS

Thomas Rupik, *Permitting Procedures for Coal Port Construction*, Dec. 1982, Bulk Solids Handling, vol. 2, No. 4.

Ludwig Rasper, *The Bucket Wheel Excavator*, 1975, Trans Tech Publication, pp. 93, 95, 132 and 137.

FMC Corporation, *Link–Belt Bucket Elevators Type 1–Chain or Belt*, Undated, pp. C–5, C–6 and C–8.

Texmarc Conveyor Co., *Fixed Height Radial Stacker*, 1988.

Texmarc Conveyor Co., *Lattice Frame Portable Conveyor*, 1988.

Texmarc Conveyor Co., *Design and Fabrication of Engineered Systems*, 1988.

Heyl & Patterson Engineers and Constructors, *Unloaders*, Undated.

PWH Anlagen & Systeme GmbH, *Europe's First Continuous Iron Ore and Coal Unloader for River Barges*, Undated.

PWH Anlagen & Systeme GmbH, *Ship Unloading Unit for Continuous Unloading*, 1985.

McNally Wellman, *Photograph of Pleasants Power Station*, Undated.

*Primary Examiner*—Frank E. Werner
*Attorney, Agent, or Firm*—Fish & Richardson P.C.

[57] ABSTRACT

This apparatus relates to a materials handling apparatus that has a plurality of open-sided buckets arranged to travel along a first path having a first sense. The buckets are loadable when traveling along a first portion of the first path. An endless belt is arranged to travel along a second path having the same sense as the first path. The first and second paths coincide in a first zone so that the belt achieves closure of the buckets along a second portion of the first path. The materials handling apparatus may be operated over a wide range of conditions by the ability to preselect and change the vertical distance, and the angle of attack between a catenary string of open-sided buckets and the material to be unloaded. The method of handling material according to the present invention is readily adaptable to the unloading of railroad gondola cars, hopper barges, lighters, trucks, yard materials and the like.

6 Claims, 7 Drawing Sheets

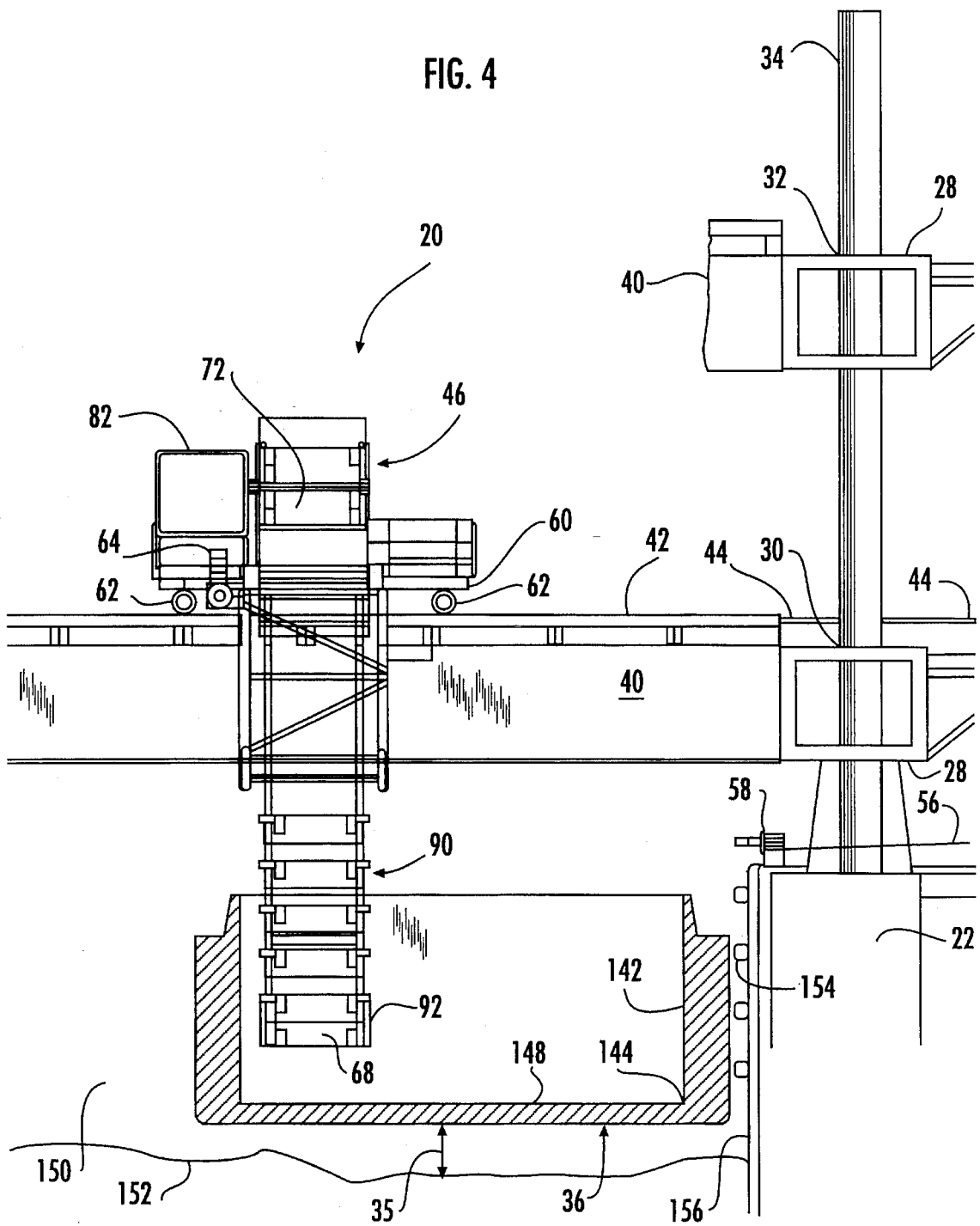

5,564,878

APPARATUS AND METHOD FOR CONTINUOUS HANDLING OF BULK MATERIALS

TECHNICAL FIELD OF THE INVENTION

The present invention relates to apparatus and methods for the handling of bulk materials, and in particular, to an apparatus and method for the unloading of bulk materials from, say, barges and the like.

BACKGROUND OF THE INVENTION

The transportation and distribution of bulk materials is an essential component of the economy of industrialized nations. Because a considerable percentage of the transportation and distribution of bulk materials is accomplished by trucks, rail cars, and sea-going vessels, highly efficient and cost-effective systems for the unloading of such vehicles represent an important link in this economic chain. This is especially true in the case of sea-going vessels that are off-loaded by transfer of materials first to much smaller, shallow drafted lighters or barges, and then into shore-based storage or transportation facilities.

Although there are many systems for the handling of bulk materials in general, a predominant system used for unloading comprises a chain or belt bucket elevator operated from a single digging boom. The boom is pivotably attached to an overhead support positioned above the material to be unloaded or moved. Elevation of the boom with respect to the load is controlled by winches. In the case of, say, barges, the bucket angle of attack relative to the barge is fixed by a short (less than 10 ft.) catenary formed at the digging end of the boom. The usual four-sided buckets are emptied by centrifugal force and/or gravity at the discharge end of the boom onto a conveyor.

While this system of barge unloading has been operational for many years, it presents several disadvantages which reduce its mechanical efficiency and cost-effectiveness. First, elevation of a single digging boom by a winch or hoist system can only be accomplished by pivoting about a restricted angle at the coupling between an overhead support and the digging boom. This restriction, combined with the fixed, short catenary, produces a substantially invariant angle of attack at the bucket-material interface. Second, a fixed catenary is unable to compensate for, say, wave action or other changes in load elevation, resulting in a loss of efficiency under normal operating conditions. Third, the limited drag-line action created by buckets in a short catenary diminishes the potential efficiency of the system. Fourth, centrifugal and or gravity discharge of the four-sided bucket requires a 180° rotation of each bucket during emptying. In addition to creating an environmental hazard from dust spillage and carry back of material, centrifugal and/or gravity discharge necessitates extension of the discharge end of the digging boom far above the transport conveyor and the angle change of the digging boom changes the transfer position relative to the conveyor. This design feature increases the horsepower requirements of the drive system. Moreover, the large capacity buckets currently used limit the chain or belt speed and require further increases of drive system horsepower to maintain unloading capacity.

SUMMARY OF THE INVENTION

In accordance with the present invention, apparatus and methods are provided which substantially reduce or eliminate problems and disadvantages associated with previous apparatus and methods for materials handling. The present invention provides a high efficiency system of compact design and enhanced environmental cleanliness for handling materials in a broad range of applications.

A materials handling system is provided which has a plurality of open-sided buckets arranged to travel along a first path having a first sense. The buckets are loadable when traveling along a first portion of the first path. An endless belt is arranged to travel along a second path having the same sense as the first path. The first and second paths coincide in a first zone so that the belt achieves closure of the buckets along a second portion of the first path.

An apparatus embodying the present invention includes a frame and a digging boom having a first and a second end. The first end of the digging boom is pivotally coupled to the frame. A return boom having a first and a second end is also pivotally coupled by its first end to the frame. The materials handling system further includes a drive means for moving a plurality of open-sided buckets along a first path which circumscribes the booms. Each of the plurality of open-sided buckets has an open side which is coupled to the drive means to form the first path. An endless belt is operatively associated with the digging boom. The movement of the endless belt defines a second path and achieves closure of the open-sided buckets upon a coincidence of the first and the second paths.

The apparatus preferably includes an open-sided digging bucket. The open-sided digging bucket has an anterior wall coupled to a bucket floor. A pair of lateral walls is coupled simultaneously to the anterior wall and the bucket floor. A belt is included for achieving closure of the open-sided digging bucket.

The method of conveying materials includes providing a first path for a belt. A second path having the same sense as the first path for a plurality of open-sided buckets is also provided. Material is introduced into the open-sided buckets. The first and second path are directed together for a portion of their travel during which the open-sided bucket is positioned adjacent the belt. The paths are separated and the buckets are rotated to empty the material therefrom.

The apparatus and methods according to the present invention for continuous handling of bulk materials overcome the disadvantages associated with prior methods of handling bulk materials, especially in the case of lighters or barges. The angle of attack at the bucket-material interface and thus unloading capacity and efficiency may be optimized over a wide range of operational conditions. In addition, the open-sided buckets act as miniature drag-line buckets to further enhance efficiency during unloading. The use of an open-sided bucket in combination with an endless belt elevator system facilitates a reduction in overall boom length. This reduction facilitates the use of a lower horsepower drive system. Finally, the unloading capacity of the system is comparable to that of prior systems, but utilizes a much smaller, more efficient system. The apparatus has the further advantage in that the lifting and travel assembly is comprised of an elevator that moves the digging and unloading unit up or down while maintaining a constant digging angle of attack. Further, the open-sided buckets discharge into a hopper integral to the digging and unloading unit and onto a transfer conveyor. The transfer conveyor is maintained at a constant position relative to the digging and unloading unit because all are moved in unison on the lifting and travel assembly.

BRIEF DESCRIPTION OF THE DRAWINGS

For a more complete understanding of the present invention and the advantages thereof, reference is now made to the following description taken in conjunction with the accompanying drawings in which:

FIG. 4 is a drawing of a front view of the digging and unloading unit.

DESCRIPTION OF THE PREFERRED EMBODIMENTS

Figure 1:
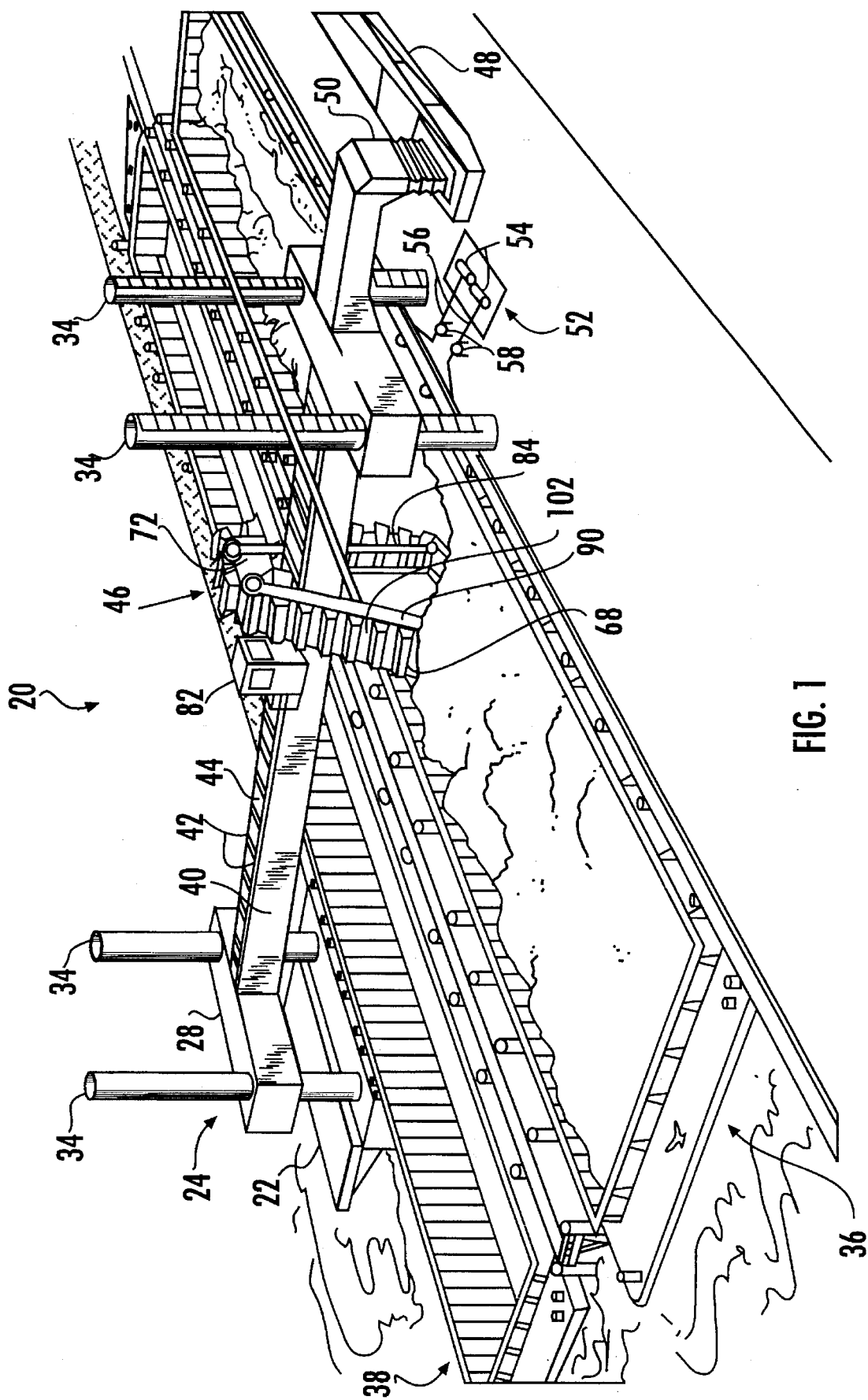
FIG. 1 is a perspective view drawing of a continuous barge unloader in accordance with the present invention.
Figure 3:
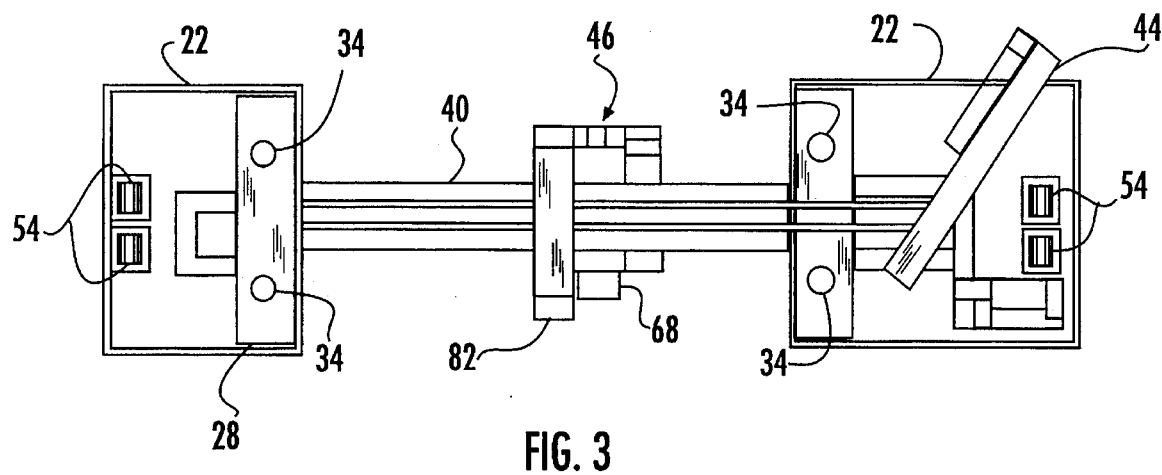
FIG. 3 is a drawing of a top view of the continuous barge unloader.

Preferred embodiments of the invention will now be described with reference to the accompanying figures.

The continuous unloader 20 of the present invention (See FIGS. 1–4) includes a support base 22 upon which a lifting and travel assembly 24 is supported. Access to the lifting and travel assembly 24 for operation, maintenance and the like is facilitated by stairs 26. The lifting and travel assembly 24 includes a pair of elevators 28 for vertical displacement of the lifting and travel assembly 24 between a first position 30 and a second position 32 upon a set of four columns 34. Vertical displacement of the lifting and travel assembly 24 is required to accommodate for differences in the draft 35 of a loaded container or barge 36 as compared to an unloaded container or barge 38. The lifting and travel assembly further includes a bridge 40 having a pair of tracks or rails 42 running the length of the bridge 40. A transfer conveyor 44 is positioned between the rails 42. A digging and unloading unit 46 is positioned on the rails 42 of the bridge 40 for horizontal displacement of the digging and unloading unit 46. In operation, bulk materials are introduced into the digging and unloading unit 46, discharged onto the transfer conveyor 44 and transported to the feed conveyor 48 via a telescopic chute 50 for transport to an alternative site.

The continuous unloader 20 may further include a container or barge mover system 52 (See FIGS. 1–4) or other load positioning system for displacing a container or barge 36 relative to the continuous unloader 20. The barge mover system 52 is mounted upon the support base 22 and includes two pairs of winches 54, four tow ropes 56, and four fairlead sheaves 58. In operation, a pair of winches 54 acting in opposition release or retract a given length of tow rope 56 to produce horizontal movement of the loaded barge 36 relative to the digging and unloading unit 46. The fairlead sheaves 58 eliminate tow rope 56 binding associated with alterations in loaded barge 38 draft 35.

The digging and unloading unit 46 (See FIGS. 1–5), includes a car or trolley 60 having a plurality of wheels 62 which ride along the rails 42 of the bridge 40. The car includes a drive motor and winch assembly 64 to facilitate horizontal displacement of the digging and unloading unit 46. In addition, impact sensors 66 provide protection from collision between the digging and unloading unit 46 and the barge 38 when the digging and unloading unit 46 approaches the side of the loaded barge 38. The car 60 includes a support frame 70 which is coupled to the wheels 62. Inside the car 60 is a hopper 72, terminating in a hopper chute 74, which directs material discharged from the digging and unloading unit 46 to the transfer conveyor 44. The transfer conveyor 44 includes a skirt 76 which overlaps the canted sidewall rollers 78 of the transfer conveyor and facilitates deposition of material on the conveyor belt 79 supported by the bottom rollers 80. The car 60 further includes an operator's cab or viewing station 82 for observing operations of the continuous barge unloader 20.

The digging and unloading unit 46 (See FIG. 5) further includes a return boom 84 having an upper return boom drive sprocket 86 and a lower return boom idler 88. The return boom 84 is pivotally attached near the upper rear corner of the car 60. A digging boom 90 is pivotally attached near the upper front corner of the car 60. The digging boom 90 includes a lower digging boom idler 92 and a drive sprocket and pulley assembly 94. The digging boom 90 further includes an endless belt conveyor 96 having an upper belt pulley 98 and a lower belt pulley 100. An endless belt 102 circumscribes the drive sprocket and pulley assembly 94 and the lower belt pulley 100. The drive sprocket pulley assembly 94 propels the endless belt 102 and the chain and bucket assembly 106 in a synchronized fashion. The upper belt pulley 98 produces forward displacement of the belt path.

The digging and unloading unit further includes a pair of endless chains 104 connected to a plurality of open-sided buckets 68 to form a chain and bucket assembly 106. The chain and bucket assembly 106 circumscribes the return boom 84 and the digging boom 90 and is propelled by the upper return boom drive sprocket 86 along a path defined by the drive sprocket and pulley assembly 94, lower return boom idler 88 and lower digging boom idler 92. The chain and bucket assembly 63 creates a catenary 98 between the lower return boom idler 88 and the lower digging boom idler 92. The catenary 98 creates a drag-line bucket effect to displace material from a position below the return boom 84 to a position below the lower digging boom idler 92. Material is introduced into the open-sided bucket 68 and closure of the open-sided bucket 68 is achieved by engagement with the endless belt 102.

The synchronized movement of the chain and bucket assembly 106 and the endless belt 102 facilitates material retention in the open-sided bucket 68. The open-sided bucket 68 and endless belt 102 combination acts as an elevator conveyor that transports material from the loaded barge 36 up the length of the digging boom 90 for discharge into the hopper 72. Discharge into the hopper 72 is accomplished by the separation of the open-sided buckets 68 from engagement with the endless belt 102. The open-sided buckets 68 continue along the path of the endless chain 104 and rotate approximately 90° after passing the drive sprocket and pulley assembly 94. Diversion of the path of the buckets from the path of the endless belt 102 by the drive sprocket and pulley assembly 94 and the upper belt pulley 98, renders the open-sided buckets 68 backless, and the material therein is discharged into the hopper 72 through the now-open back.

The digging and unloading unit (See FIG. 5) further includes a chain tensioning assembly 110 which includes a pair of hydraulic cylinder assemblies 112, 116. A first hydraulic cylinder assembly 112 is attached to the support frame 70 and digging boom 90. A second hydraulic cylinder 116 is attached to the support frame 70 and the return boom 84. The hydraulic cylinder assemblies 112, 116 share a connection 120 which facilitates their concerted action. The chain tensioning assembly 110 operates to control sag of the chain and bucket assembly 106 and to provide the catenary 108.

Figure 6:
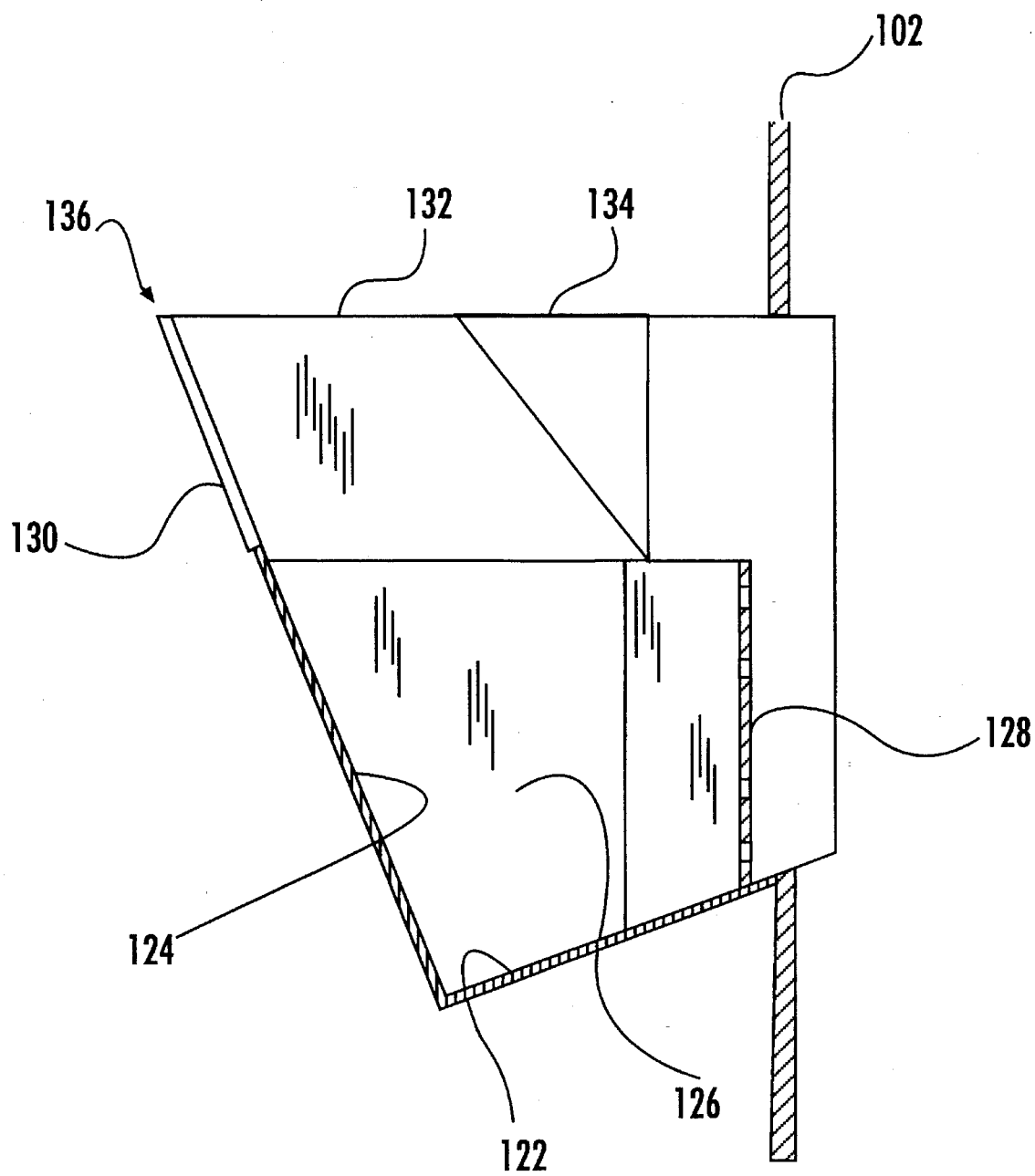
FIG. 6 is a drawing of a side view of the open-sided bucket.
Figure 7:
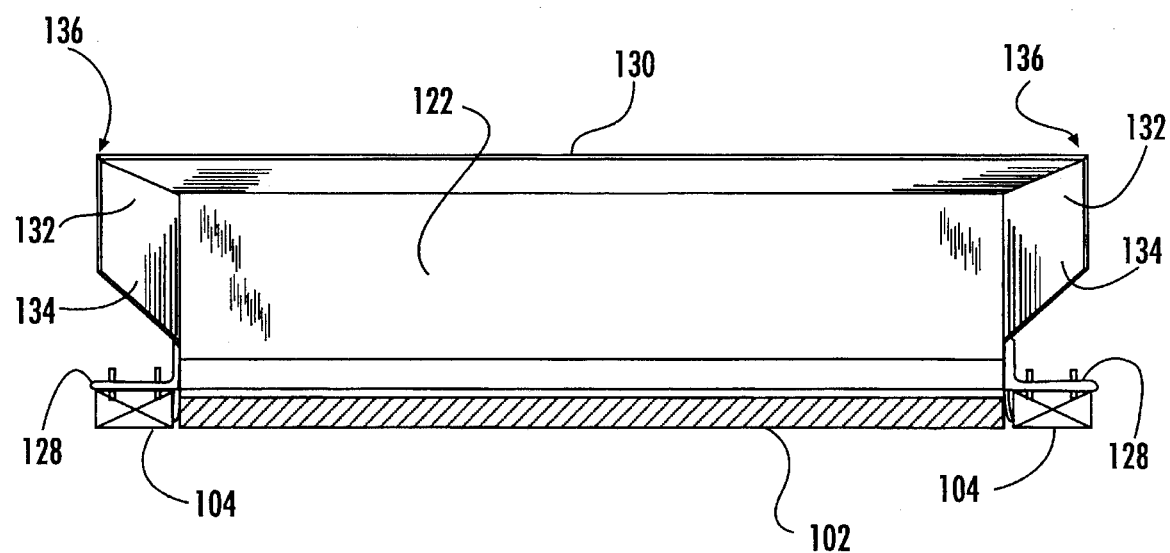
FIG. 7 is a drawing of a top view of the open-sided bucket.
Figure 8:
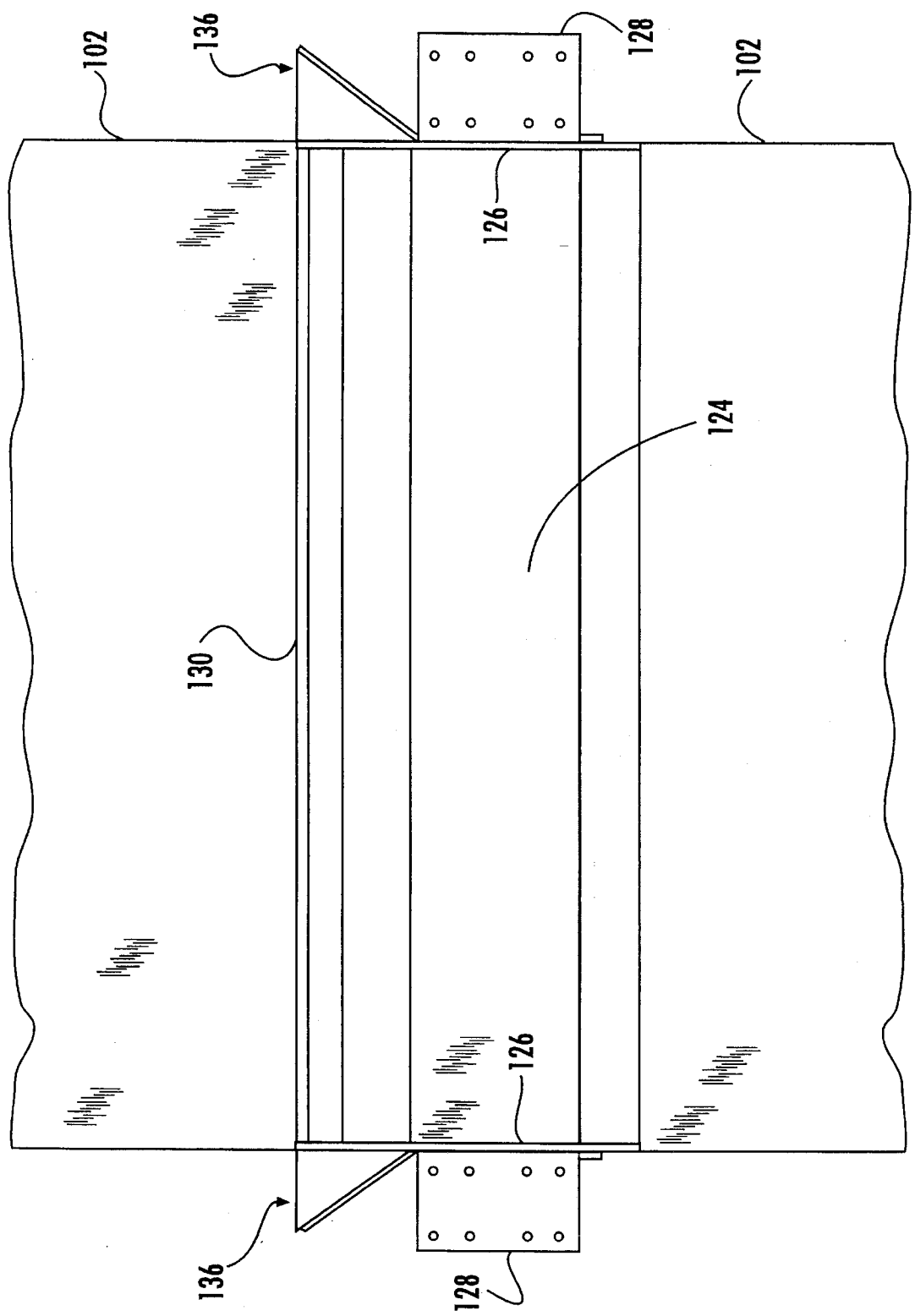
FIG. 8 is a drawing of a back view of the open-sided bucket.

Although a variety of buckets are contemplated to fall within the scope of the present invention, it has been found particularly advantageous to use the bucket of FIGS. 6–8. The open-sided buckets 68 include a bucket floor 122 coupled to an anterior wall 124. Disposed between the bucket floor 122 and the anterior wall 124 are a pair of lateral walls 126. Attached to each of the lateral walls 126 is a mounting plate 128 for connecting the open-sided bucket 68 to the endless chain 104. The open-sided bucket 68 further includes an anterior cutting plate 130 attached to and extending beyond the width of the anterior wall 128. A lateral rectangular cutting plate 132 is attached simultaneously to each of the lateral walls 126 and to opposite ends of the anterior cutting plate 130. A lateral triangular cutting plate 134 is attached simultaneously to each of the lateral walls and each of the lateral rectangular cutting plates 132. The anterior cutting plate 130, the lateral triangular cutting plate 134 and the lateral rectangular cutting plate 132 are joined to form an anteriolateral cutting head 136. The anteriolateral cutting head 136 protects the coupling between the mounting plate 128 and the endless chain 104 from excessive contact with the load and thereby reduces wear of the endless chain 104.

The operation of an apparatus for continuous handling of bulk materials in accordance with the present invention may be summarized as follows. The lifting and travel assembly 24 supports the digging and unloading unit 46. The vertical movement of the elevators 28 controls the digging depth, and the drive motor and winch assembly of the car 64 controls the lateral movement of the digging and unloading unit 46. The digging and unloading unit 46 digs the material by means of the catenary 108 defined by the chain and bucket assembly 106 spanning the space between the digging boom 90 and the return boom 84. The material is pulled forward from the lower return boom idler 88 to the lower digging boom idler 92 and lifted along a nearly vertical path on the digging boom 90. The digging boom 90 has an integral endless belt conveyor 96 to achieve closure of the open-sided bucket 68. The combination of the open-sided bucket 68 and the endless belt 102 perform as a bucket elevator to lift the material over the drive sprocket and pulley assembly 94. The path of the endless belt 102 is diverted by the drive sprocket and pulley assembly 94 and the upper belt pulley 98 to produce a backless, open-sided bucket 68, and the material therein discharges into the hopper 72. The hopper 72 discharges via the hopper chute 44 onto the transfer conveyor 44 which runs the length of the lifting and travel assembly 24. The orientation of the open-sided bucket 68 and the hopper 72 remain constant such that the point of transfer of material is fixed irrespective of changes in the position of the digging and unloading unit 46. The transfer conveyor 44 subsequently discharges via the telescopic chute 80 into the feed conveyor 48 which carries the material to an alternative final destination.

The interaction of the continuous unloader 20 with a loaded barge 36 may be summarized as follows (See FIGS. 1, 2, 4 and 5). A loaded barge 36 is positioned within a canal 138 such that the continuous barge unloader 20 is athwartship the loaded barge 36. The return boom 84 of the digging and unloading unit 46 is positioned several feet from the transom or posterior wall 140 and equidistant from the lateral bulkheads or walls 142 of the loaded barge 36. The digging and unloading unit 46 makes an initial "hogging" pass along the length of the barge and removes between 60 and 70% of the barge material.

A final oscillating cleanup pass removes the remaining 30 to 40% of the material as follows. The loaded barge 36 is repositioned by the barge mover system 52 such that the return boom is positioned as close as is practicable to the juncture of one lateral wall 142 and the posterior wall 140 of the loaded barge 136. The cleanup pass begins at the interior corner 144 and proceeds simultaneously in a forward and lateral oscillating pattern. The catenary 108 of the digging and unloading unit 46 produces a drag-line action of the open-sided buckets 68 and significantly enhances material removal. In addition, superior cleaning of barge interior corners 144 is facilitated by the substantially vertical orientation of the return boom 84 with respect to the posterior wall 44 of the loaded barge 36. Moreover, vertical displacement of the digging and unloading unit 46 and control of the catenary 108 sag by the elevator 28 and the chain tensioning assembly 110, respectively, facilitate the maintenance of a substantially constant angle of attack 146 between the open-sided buckets 68 and the barge floor 148. Maintenance of this angle of attack 146 enhances bucket 68 loading during alterations of barge draft 35 associated with unloading and wave action. (See FIG. 5).

Figure 2:
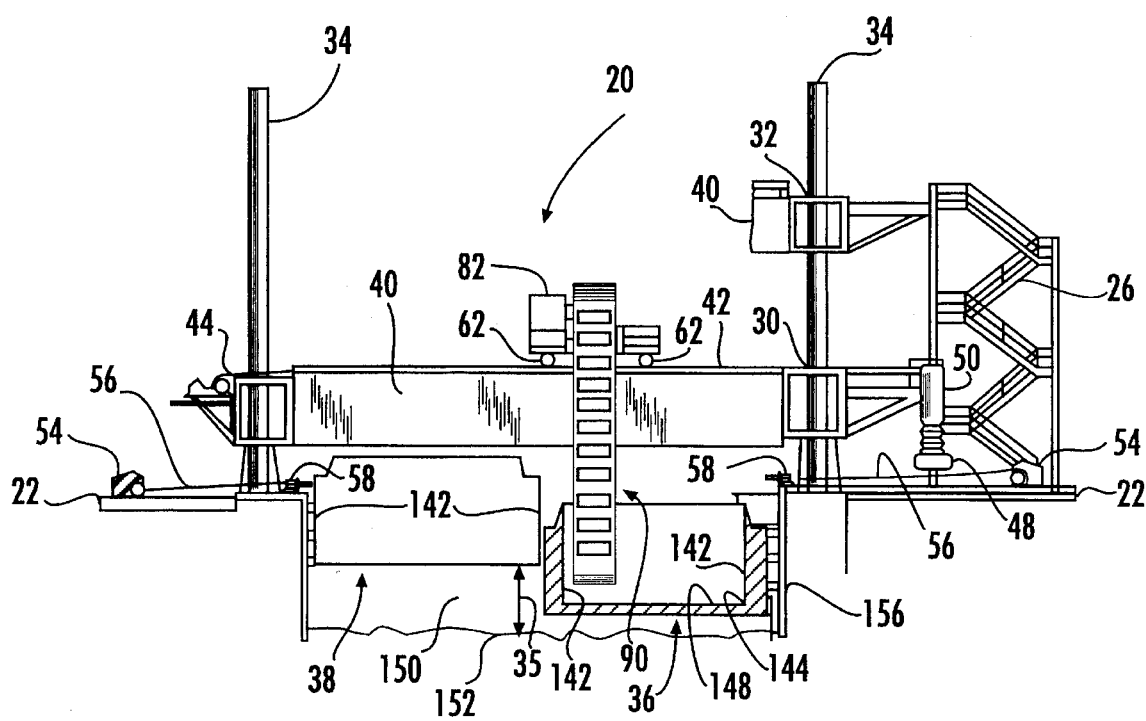
FIG. 2 is a drawing of a front view of the continuous barge unloader.
Figure 5:
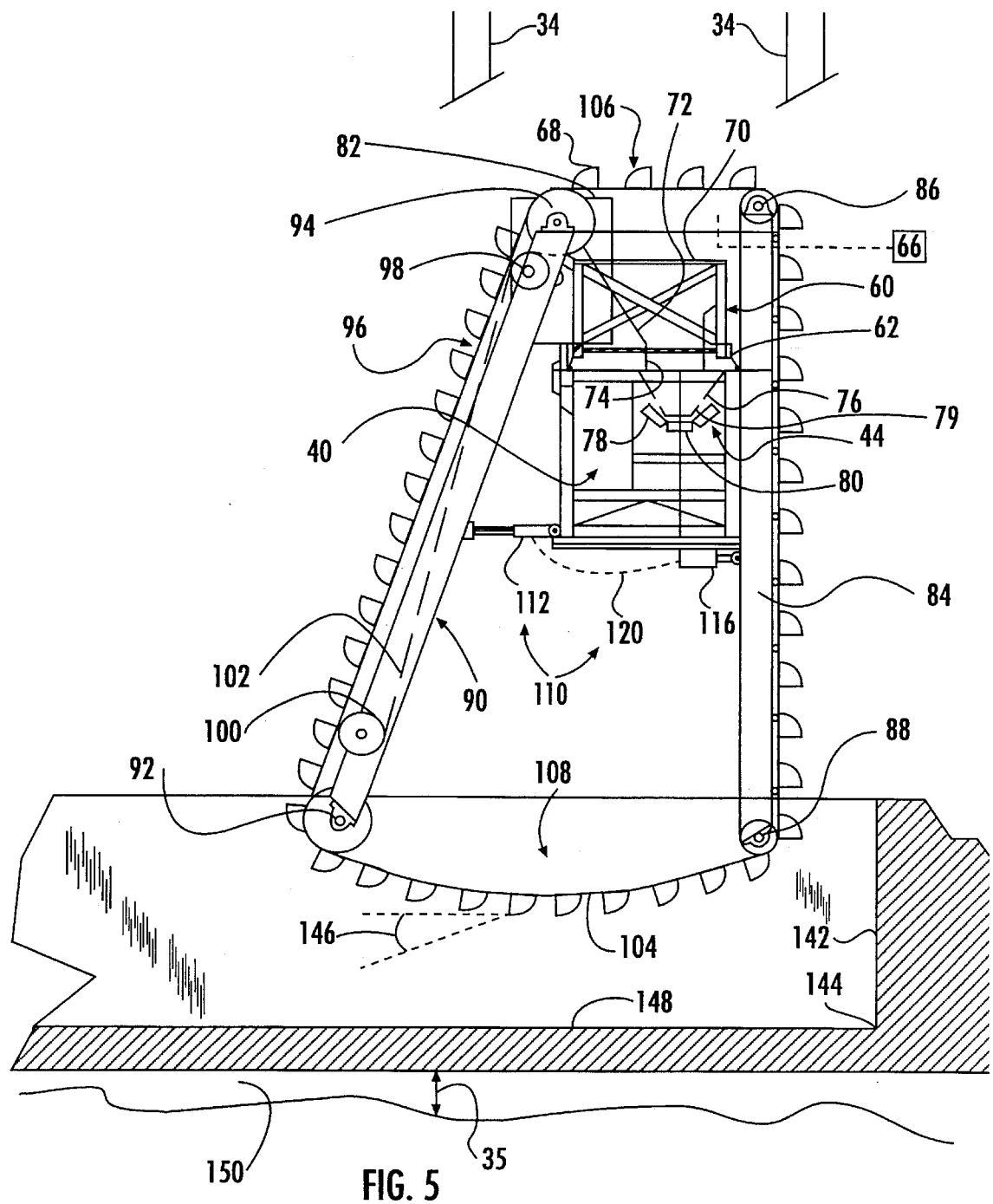
FIG. 5 is a drawing of a side view of the digging and unloading unit.

The digging unloading unit 46 is then moved athwartship from the unloaded barge 38, to a new position athwartship a loaded barge 36, and the process is repeated (See FIG. 2). The difference in the draft of an unloaded barge 38 as compared to a loaded barge 36 is depicted by the increased depth of water 150 between the barge floor 148 and the seabed 152 (See the left half as compared to the right half of FIG. 2). In addition to producing displacement of the barge, the barge mover system 52 assists in securing the barge in contact with the fenders 154 of the canal bulkhead 156.

It will be appreciated by those of skill in the art of materials handling that the present apparatus and methods provide a variety of off-loading capabilities. The apparatus and method described herein are conformable to, but not limited to, lighters, use with hopper barges, railroad gondola cars, semi-tractor trailers, and yard materials. Where the materials or the container for the materials are stationary, an alternative embodiment of the present invention provides a movable materials handling system. More specifically, the lifting and traveling assembly 24 may be mechanically associated with a transport means so that the materials handling system may be positioned above the materials. Moreover, for use in landscaping, construction or farming applications the digging and unloading unit 46 may be associated with a tractor, bulldozer, front-end loader, or the like.

The apparatus and methods of the present invention provide several advantages over prior unloading systems. In particular, the present invention provides a more compact design, increased efficiency, and enhanced environmental cleanliness. Discharge of the materials from the open-sided buckets 68 by separating the paths of the chain and bucket assembly 106 and the endless belt 102 and by rotating the open-sided buckets 68 90° facilitates a reduction in the length of the digging boom 90. A shorter digging boom 90 facilitates a reduction in the horsepower of the drive system. These features provide a more compact design as compared to previous systems. In addition, discharge of the open-sided buckets 68 by a 90° rotation enhances environmental cleanliness when compared with previous systems that utilize a 180° rotation (i.e., centrifugal throw and/or gravity) of a closed bucket. Material discharged by centrifugal and/or gravity throw often strikes the bottom of the preceding bucket and produces dust creating an increased environmental hazard. Moreover, the fixed point of material transfer between the open-sided buckets 68 and the hopper 72 enhances the load-out efficiency of the continuous unloader 20.

A significant feature of the present system of materials handling is its increased efficiency over prior systems. First, the digging and unloading unit 46 maintains a selected angle of attack 146 relative to the surface upon which material to be loaded is positioned and is therefore unaffected by elevation changes which alter load efficiency in traditional pivoting arm systems. Second, because the open-sided buckets 68 travel over the top of the digging boom 90 and then proceed horizontally, a more complete discharge into the hopper 72 may be achieved. Additionally, the open-sided bucket 68 design combined with the catenary 108 produces a drag-line action thereby increasing the efficiency of bucket filling (i.e., improved load-out) and decreasing residual material (i.e., improved clean-out).

Although the present invention and its advantages have been described in detail in the environment of barge unloading, it should be understood that various changes, substitutions and alterations can be made therein without departing from the spirit and scope of the invention as defined by the following claims.

What is claimed is:

1. A material handling system for digging and transporting a material, said system comprising:

a frame;

a first boom having a first and a second end, said first end of said first boom being pivotally coupled to said frame;

a second boom having a first and a second end, said first end of said second boom being pivotally coupled to said frame;

a drive apparatus for moving a plurality of buckets along a first path circumscribing said booms;

a plurality of buckets each having a loading opening located in a first plane and an unloading opening located in a second plane, said buckets operatively coupled to said drive apparatus to form said first path; and an endless belt operatively associated with said first boom, movement of said endless belt defining a second path, said endless belt operable to achieve closure of said unloading opening upon a coincidence of said first and said second paths.

2. The material handling system of claim 1, further comprising:

a catenary defined by a sag of said first path between said second ends of said booms.

3. The material handling system of claim 2, further comprising:

a tensioner for controlling the sag in said catenary.

4. The material handling system of claim 3, wherein said tensioner further comprises:

a first hydraulic cylinder operably disposed between said first boom and said frame; and a second hydraulic cylinder operably disposed between said second boom and said frame.

5. The material handling system of claim 3, wherein said buckets further comprise:

a cutting head arranged to clear a path for said drive apparatus during movement of said buckets along said first path.

6. The material handling system of claim 5, wherein said cutting head further comprises:

a front cutting plate having first and second ends;

a pair of rectangular side cutting plates each coupled to one of said ends; and a pair of triangular side cutting plates each coupled to one of said rectangular side cutting plates.

* * * * *